(12) United States Patent
Matsuo et al.

(10) Patent No.: US 11,487,747 B2
(45) Date of Patent: Nov. 1, 2022

(54) ANOMALY LOCATION IDENTIFICATION DEVICE, ANOMALY LOCATION IDENTIFICATION METHOD, AND PROGRAM

(71) Applicant: NIPPON TELEGRAPH AND TELEPHONE CORPORATION, Chiyoda-ku (JP)

(72) Inventors: Yoichi Matsuo, Yokosuka (JP); Yasuhiro Ikeda, Yokosuka (JP); Keishiro Watanabe, Yokosuka (JP); Ryoichi Kawahara, Yokosuka (JP)

(73) Assignee: NIPPON TELEGRAPH AND TELEPHONE CORPORATION, Chiyoda-ku (JP)

(*) Notice: Subject to any disclaimer, the term of this patent is extended or adjusted under 35 U.S.C. 154(b) by 124 days.

(21) Appl. No.: 16/961,128

(22) PCT Filed: Dec. 26, 2018

(86) PCT No.: PCT/JP2018/047898
§ 371 (c)(1),
(2) Date: Jul. 9, 2020

(87) PCT Pub. No.: WO2019/138891
PCT Pub. Date: Jul. 18, 2019

(65) Prior Publication Data
US 2020/0372009 A1 Nov. 26, 2020

(30) Foreign Application Priority Data
Jan. 12, 2018 (JP) .............................. JP2018-003117

(51) Int. Cl.
*G06F 11/00* (2006.01)
*G06F 16/23* (2019.01)
*G06F 11/07* (2006.01)

(52) U.S. Cl.
CPC ...... *G06F 16/2365* (2019.01); *G06F 11/0754* (2013.01)

(58) Field of Classification Search
CPC ............... G06F 11/0709; G06F 11/079; G06F 11/0754; G06F 11/2252; G06F 11/2257
See application file for complete search history.

(56) References Cited

U.S. PATENT DOCUMENTS 9,632,861 B1 4/2017 Watanabe et al.
2014/0325276 A1* 10/2014 Yabuki ................ G06F 11/0709
714/26

(Continued)

FOREIGN PATENT DOCUMENTS

| JP | 2016-45556 A | 4/2016 |
| JP | 2016-189062 A | 11/2016 |
| JP | 2017-111601 A | 6/2017 |

OTHER PUBLICATIONS

Kim, Myunghwan et al., Root Cause Detection in a Service-Oriented Architecture, 2013, ACM (Year: 2013).*

(Continued)

*Primary Examiner* — Marc Duncan
(74) *Attorney, Agent, or Firm* — Oblon, McClelland, Maier & Neustadt, L.L.P.

(57) ABSTRACT

An anomaly location identification device includes a determination unit configured to determine presence or absence of an anomaly by inputting part or all of information items output from a plurality of devices into an anomaly detection algorithm; a calculation unit configured to calculate, in response to a determination made by the determination unit that an anomaly is present, with respect to one of the information items, an index indicating a degree of contribution to the anomaly; and an identification unit configured to perform calculation by an analysis algorithm using a causal model receiving the index as input, to identify an (Continued)

anomalous device, to improve the precision and calculation speed related to identification of an anomaly location.

7 Claims, 3 Drawing Sheets

(56) References Cited

U.S. PATENT DOCUMENTS

2017/0017537 A1* 1/2017 Razin .................. G06F 11/0709
2018/0348747 A1* 12/2018 Lavid Ben Lulu .. G05B 13/048
2019/0188065 A1* 6/2019 Anghel ............... G06F 11/0778

OTHER PUBLICATIONS

International Search Report dated Apr. 2, 2019 in PCT/JP2018/047898 filed on Dec. 26, 2018, 2 pages.

Kandula, S. et al., "Shrink: A Tool for Failure Diagnosis in IP Networks," Proceedings of the 2005 ACM SIGCOMM workshop on Mining network data, 2005, pp. 173-178.

Kompella, R.R. et al., "IP Fault Localization via Risk Modeling," NSDI '05: 2nd Symposium on Networked Systems Design & Implementation, vol. 2, 2005, pp. 57-70.

Yan, H. et al., "G-RCA: A Generic Root Cause Analysis Platform for Service Quality Management in Large IP Networks," IEEE/ACM Transactions on Networking, vol. 20, No. 6, 2012, pp. 1734-1747, 15 total pages.

Matsuo, Y. et al., "Root Cause Analysis for Unknown Failures," IEICE General Conference, B-7-35, 2017, p. 128, 3 total pages (with partial English translation).

Hodge, V. J. et al., "A Survey of Outlier Detection Methodologies.," Artificial Intelligence Review, 2004, pp. 1-43, 44 total pages.

Sakurada, M. et al., "Dimensionality Reduction with the Autoencoder for Anomaly Detection of Spacecrafts," The 28th Annual Conference of the Japanese Society for Artificial Intelligence, 2014, pp. 1-3, 4 total pages (with English Abstract).

Ikeda, Y. et al., "Inferring causal parameters of anomalies detected by autoencoder using sparse optimization", IEICE Technical Report, vol. 117, No. 89, 2017, pp. 61-66, 7 total pages (with English Abstract).

Japanese Office Action dated Jun. 22, 2021 in Japanese Patent Application No. 2019-564632 (with English translation), 6 pages.

* cited by examiner

US 11,487,747 B2

ANOMALY LOCATION IDENTIFICATION DEVICE, ANOMALY LOCATION IDENTIFICATION METHOD, AND PROGRAM

TECHNICAL FIELD

The present invention relates to an anomaly location identification device, an anomaly location identification method, and a program.

BACKGROUND ART

When handling an anomaly in a communication system, it is important to rapidly execute (1) anomaly detection, and (2) anomaly location/cause identification, and for each of (1) and (2), various methods have been proposed (e.g., Non-patent documents 1 to 7).

First, regarding (1), a method has been generally known that individually calculates the outlierness or the like for each device in the system, by using observation information of the device, and if the outlierness exceeds a threshold, determines it as an anomaly to raise an alert. In this method, an anomaly detection method is applied to the respective devices independently; therefore, if an anomaly is detected, it is possible to identify which observation information item of which one of the devices relates to the anomaly. Meanwhile, as in Non-patent document 6, a method has been proposed that determines the presence or absence of an anomaly in the entire system from various observation information items in a system. This method determines an anomaly by taking into consideration the correlation among the observation information items obtained in the entire system. However, in this method, only the presence or absence of an anomalous state in the entire system can be determined, and it is not possible to identify which observation information item of which one of the devices relates to the anomaly. In order to solve this problem, a method has been proposed that uses an anomaly contribution degree calculation algorithm to calculate which observation information item contributes to an anomaly when the anomaly is detected (hereafter, referred to as "contribution degree"), and narrows down anomalous observation information items. This enables to estimate the state of the observation information output by each device while determining the anomaly of the entire system, and to determine which observation information item is anomalous based on the result of the anomaly detection method so as to take measures (Non-patent document 7).

Also, regarding (2), in the conventional anomaly location/cause identification techniques, there are techniques such that the traffic volume is alerted based on a threshold or the like, or by using an alert of syslog as the observation information, and based on a causal relationship between a predetermined device state and the observation information, an anomaly location is identified. Thus, when alerts are issued from devices, one of the devices is identified as the anomaly location. Based on this result, measures can be taken for the anomalous device.

RELATED ART DOCUMENTS

Non-Patent Documents

Non-Patent Document 1: Srikanth Kandula, Dina Katabi, and Jean-philippe Vasseur. Shrink: A tool for failure diagnosis in IP networks. Proceedings of the 2005 ACM SIGCOMM workshop on Mining network data, pages 173-178, 2005.

Non-Patent Document 2: R. R. Kompella, J. Yates, A. Greenberg, and A. C. Snoeren. IP Fault Localization via Risk Modeling. IEEE Transactions on Dependable and Secure Computing, 7(4):1-14, 2010.

Non-Patent Document 3: He Yan, Lee Breslau, Zihui Ge, Dan Massey, Dan Pei, and Jennifer Yates. G-RCA: A Generic Root Cause Analysis Platform for Service Quality Management in Large IP Networks. IEEE/ACM Transactions on Networking, 20(6):1734-1747, 2012.

Non-Patent Document 4: Yoichi Matsuo, Yusuke Nakano, Akira Watanabe, Keishiro Watanabe, Keisuke Ishibashi, Ryoichi Kawahara, "Examination of Technique for Estimating Cause of Atypical Failure", IEICE General Conference, B-7-35, 2017.

Non-Patent Document 5: Hodge, Victoria J., and Jim Austin. "A survey of outlier detection methodologies", Artificial intelligence review 22.2 (2004): 85-126.

Non-Patent Document 6: Mayu Sakurada and Takehisa Yairi, "Anomaly detection of spacecraft by dimension reduction using autoencoder", Proc. of national convention of the Japanese Society for Artificial Intelligence 28, 1-3, 2014

Non-Patent Document 7:

Ikeda, Ishibashi, Nakano, Watanabe, Kawahara, "Inferring causal parameters of anomalies detected by autoencoder using sparse optimization", IEICE Technical Report, vol. 117, no. 89, IN2017-18, pp. 61-66, June 2017.

SUMMARY OF INVENTION

Problem to be Solved by the Invention

In the case of applying an anomaly detection method to each device independently, when an anomaly occurs, not only the anomalous device but also the observation information of the devices around the anomalous device may be affected and the anomaly may be detected on multiple devices, and in some cases, the anomalous device and observation information cannot be identified uniquely. Also, in the case of applying an anomaly detection method to each device independently, there is a risk that if the outlierness or the like does not reach a threshold, the detection of an anomaly fails and no alert is raised from the anomalous device.

Therefore, in the case of applying such an anomaly detection method, if anomalies are detected in multiple devices, it is necessary to apply the technique of (2) to identify the anomaly location; however, on the other hand, the technique of (2) assumes that an alert is raised from a specific device where an anomaly occurred. Therefore, if anomaly detection fails and no alert is raised from the device where an anomaly occurred, problems may arise such that the anomaly itself cannot be detected; the estimation precision of the anomaly location decreases; the time required for identifying the anomaly location and cause becomes longer; and the like. Also, as in Non-patent document 7, by calculating an anomaly degree of the entire system and a contribution degree with respect to the anomaly degree, it is possible to narrow down devices that output anomalous observation information; however, it is not always possible to uniquely identify the device. The contribution degrees of the observation information issued by devices around an anomalous device may be high; therefore, it may be necessary to manually determine which device is anomalous from among the multiple devices.

The present invention has been made in view of the above points, and has an object to improve the precision and calculation speed related to identification of an anomaly location.

Means for Solving the Problem

Thereupon, in order to solve the above problems, an anomaly location identification device includes a determination unit configured to determine presence or absence of an anomaly by inputting part or all of information items output from a plurality of devices into an anomaly detection algorithm; a calculation unit configured to calculate, in response to a determination made by the determination unit that an anomaly is present, with respect to one of the information items, an index indicating a degree of contribution to the anomaly; and an identification unit configured to perform calculation by an analysis algorithm using a causal model receiving the index as input, to identify an anomalous device.

Advantage of the Invention

It is possible to improve the precision and calculation speed related to identification of an anomaly location.

EMBODIMENTS OF THE INVENTION

Figure 1:
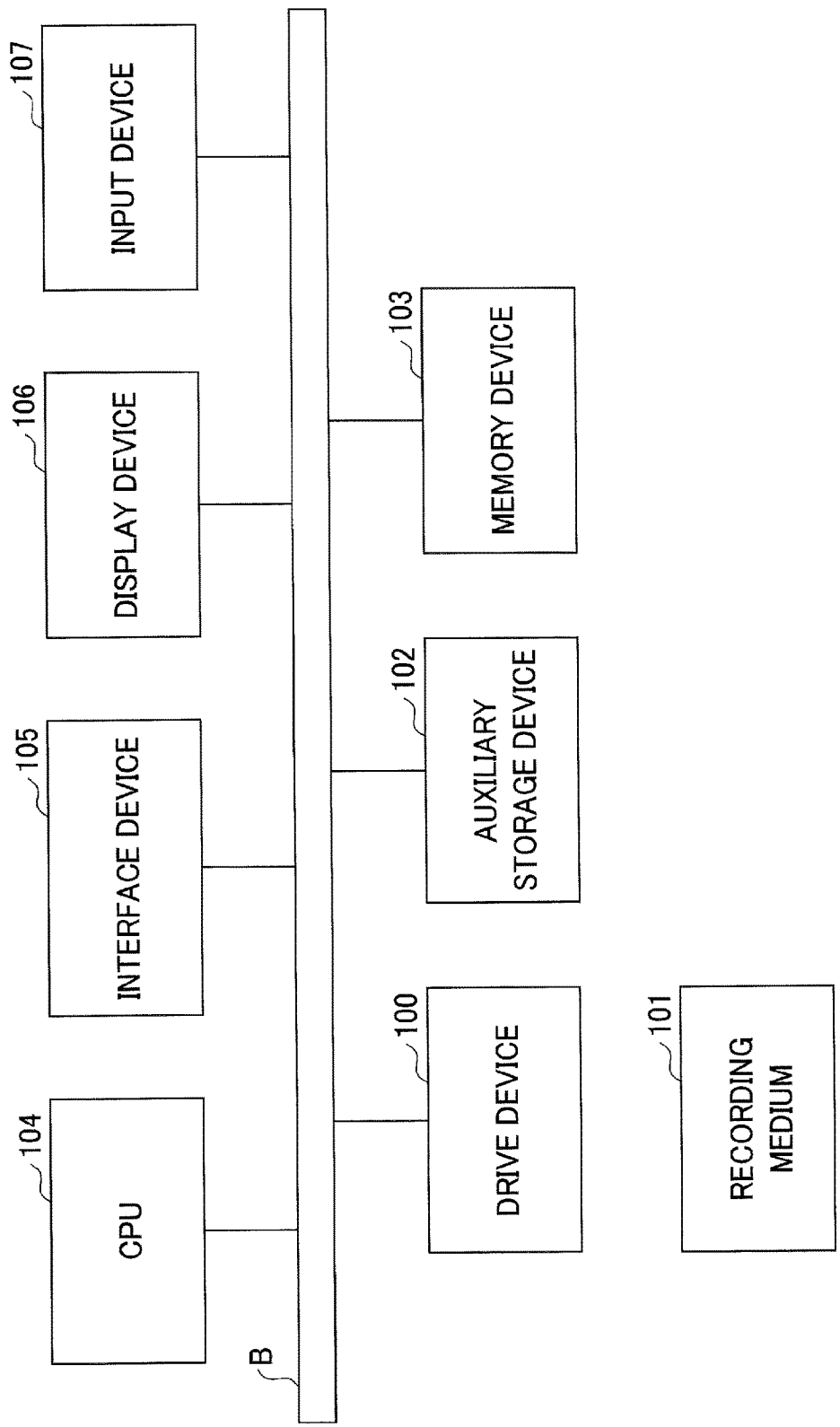
FIG. 1 is a diagram illustrating an example of a hardware configuration of an anomaly location identification device 10 according to an embodiment of the present invention.

In the following, embodiments of the present invention will be described with reference to the drawings. In the present embodiment, anomaly detection techniques are effectively linked with anomaly location/cause identification techniques to improve the precision and calculation speed of anomaly location/cause identification.

By using an information group output from devices (hereafter, referred to as the "observation information group") in a system including multiple devices to be observed, and applying the anomaly detection techniques to determine the presence or absence of an anomaly in the entire system, the presence or absence of an anomaly in the entire system is determined. If an anomaly is present in the system, for each item of information included in the observation information group (hereafter, referred to as the "observation information"), an index indicating a degree of contribution to the detected anomaly (hereafter, referred to as the "contribution degree") is calculated, and the contribution degree is input into the anomaly location/cause identification method. By inputting the contribution degrees into the anomaly location/cause identification technique, it is possible to solve the problem that by using only the anomaly detection technique and the contribution degrees, an anoma- lous device cannot be precisely identified in the case where the observation information having high contribution degrees appears on multiple devices. Also, by inputting the contribution degrees into the anomaly location/cause identification technique, the precision degradation based on the missed alert due to failure of anomaly detection by the anomaly location/cause identification technique that handles only the alert, is solved. As a method of inputting the contribution degrees into the anomaly location/cause identification technique, there are methods such that a certain threshold is set, and if the contribution degree is greater than or equal to the threshold, 1 is set, otherwise, 0 is set as a binary value; or the contribution degree is input as it is.

Changes in traffic and resources that are not alerted due to failure of anomaly detection also appear in the contribution degrees. Also, for an anomaly that propagates in a system, the contribution degree of the observation information of a device closer to the anomaly location/cause takes a higher value. Therefore, by inputting the contribution degrees to the anomaly location/cause identification method, it is possible to improve the precision and calculation speed as compared with the conventional method using an alert as input. Further, by applying the anomaly location/cause identification technique only to devices around a device that outputs the observation information with a high contribution degree, the calculation range for the anomaly location/cause identification technique can be limited to a part of, not the entirety of, a system; therefore, it is possible to speed up the anomaly location/cause identification method. As such, the effective linkage between anomaly detection and anomaly location/cause identification improves the precision and calculation speed of anomaly location/cause identification.

Next, an anomaly location identification device 10 that executes the above processing will be described specifically. FIG. 1 is a diagram illustrating an example of a hardware configuration of an anomaly location identification device 10 according to an embodiment of the present invention. The anomaly location identification device 10 in FIG. 1 includes a drive device 100, an auxiliary storage device 102, a memory device 103, a CPU 104, an interface device 105, a display device 106, and an input device 107, which are connected with each other via a bus B.

A program that implements processing on the anomaly location identification device 10 is provided by a recording medium 101 such as a CD-ROM. When the recording medium 101 storing the program is set into the drive device 100, the program is installed in the auxiliary storage device 102 from the recording medium 101 through the drive device 100. However, installation of the program does not necessarily need to be done from the recording medium 101; the program may be downloaded from another computer via a network. The auxiliary storage device 102 stores the installed program and stores necessary files, data, and the like.

The memory device 103 reads out the program from the auxiliary storage device 102 and stores the program when an activation command of the program is received. The CPU 104 implements functions relating to the anomaly location identification device 10 according to the program stored in the memory device 103. The interface device 105 is used as an interface for connecting to a network. The display device 106 displays a GUI (Graphical User Interface) or the like based on a program. The input device 107 is constituted with a keyboard, a mouse, and the like, and is used for inputting various operational commands.

Note that the anomaly location identification device 10 may not have the display device 106 and the input device 107. In this case, a terminal or the like that can be connected to the anomaly location identification device 10 via a network may function as the display device 106 and the input device 107. Also, the anomaly location identification device 10 may be constituted with multiple computers.

Figure 2:
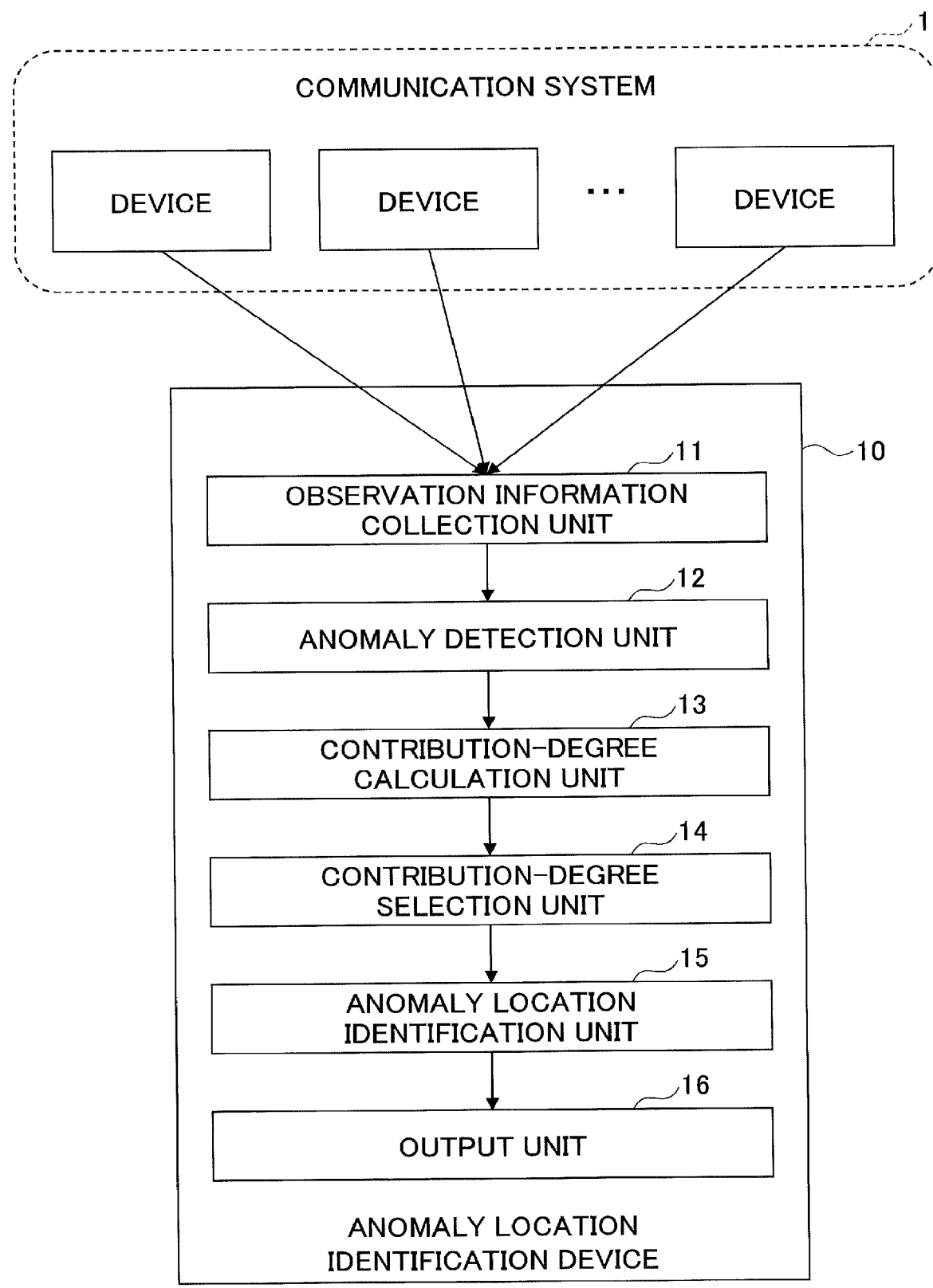
FIG. 2 is a diagram illustrating an example of a functional configuration of the anomaly location identification device 10 according to the embodiment of the present invention.

FIG. 2 is a diagram illustrating an example of a functional configuration of the anomaly location identification device 10 according to the embodiment of the present invention. In FIG. 2, the anomaly location identification device 10 includes an observation information collection unit 11, an anomaly detection unit 12, a contribution-degree calculation unit 13, a contribution-degree selection unit 14, an anomaly location identification unit 15, and an output unit 16. Each of these units is implemented by a process that one or more programs installed in the anomaly location identification device 10 cause the CPU 104 to execute.

The observation information collection unit 11 regularly collects an observation information group from devices (e.g., a communication device such as a router) constituting the communication system 1. Note that each device outputs one or more types of observation information (e.g., traffic volume, resource information, syslog, and the like). The types and number of observation information items output by the respective devices may be the same or may be different. For example, if the devices are of the same type and the same model, the types and number of observation information items output from the devices are the same; or if the types or models of devices are different, the types and number of observation information items output from the devices may be different. For example, if there are five devices and each device outputs five items of observation information, 5×5=25 items of observation information are collected at one collection time.

The anomaly detection unit 12 inputs part or all of an observation information group collected by the observation information collection unit 11, into each of multiple known anomaly detection algorithms (e.g., Non-patent document 7), to determine the presence or absence of an anomaly in the communication system 1. For example, each of the anomaly detection algorithms calculates an anomaly degree based on the observation information and compares the anomaly degree with a threshold, to determine the presence or absence of an anomaly. Note that the types and number of observation information items input into the respective anomaly detection algorithm may be different. Also, the method of determining the presence or absence of an anomaly by each anomaly detection algorithm depends on its anomaly detection algorithm.

In the case where an anomaly has been detected by one or more anomaly detection algorithms (an anomaly has been determined to be present), the contribution-degree calculation unit 13 calculates the contribution degree to the anomaly for each observation information item input into the detection algorithms that have detected the anomaly, among the observation information group collected by the observation information collection unit 11. In the case where multiple anomaly detection algorithms detect an anomaly, the contribution degree is calculated by each of the multiple anomaly detection algorithms with respect to the observation information input into the anomaly detection algorithm. This is because the value of a contribution degree is affected by a function used in an anomaly detection algorithm. Therefore, assuming that the observation information included in the observation information group consists of 25 items, and in the case where an anomaly is detected by two types of detection algorithms, where one is an anomaly detection algorithm A receiving 15 items of observation information as inputs, and the other is an anomaly detection algorithm B receiving 20 items of observation information as inputs, 15 contribution degrees are calculated with the anomaly detection algorithm A, and 20 contribution degrees are calculated with the anomaly detection algorithm B. The calculation of contribution degrees may be performed using a method described in Non-patent document 7.

The contribution-degree selection unit 14 selects contribution degrees as an input into the anomaly location/cause identification method. For example, in the case where an anomaly is detected by the two types of anomaly detection algorithms as described above, the contribution-degree selection unit 14 determines whether to input the contribution degrees calculated with one of the anomaly detection algorithms, or to input parts of the contribution degrees calculated with the respective anomaly detection algorithms that have detected the anomaly, into the anomaly location/cause identification method.

Based on an analysis algorithm (Non-patent documents 1-4) using a causal model receiving as an input contribution degrees selected by the contribution-degree selection unit 14, the anomaly location identification unit 15 identifies (estimates) an anomaly location (an anomalous device or a device having a cause of the detected anomaly).

The output unit 16 outputs information representing the anomaly location (anomalous device) identified by the anomaly location identification unit 15. For example, the information may be displayed on the display device 106, or the information may be output by another output method.

Figure 3:
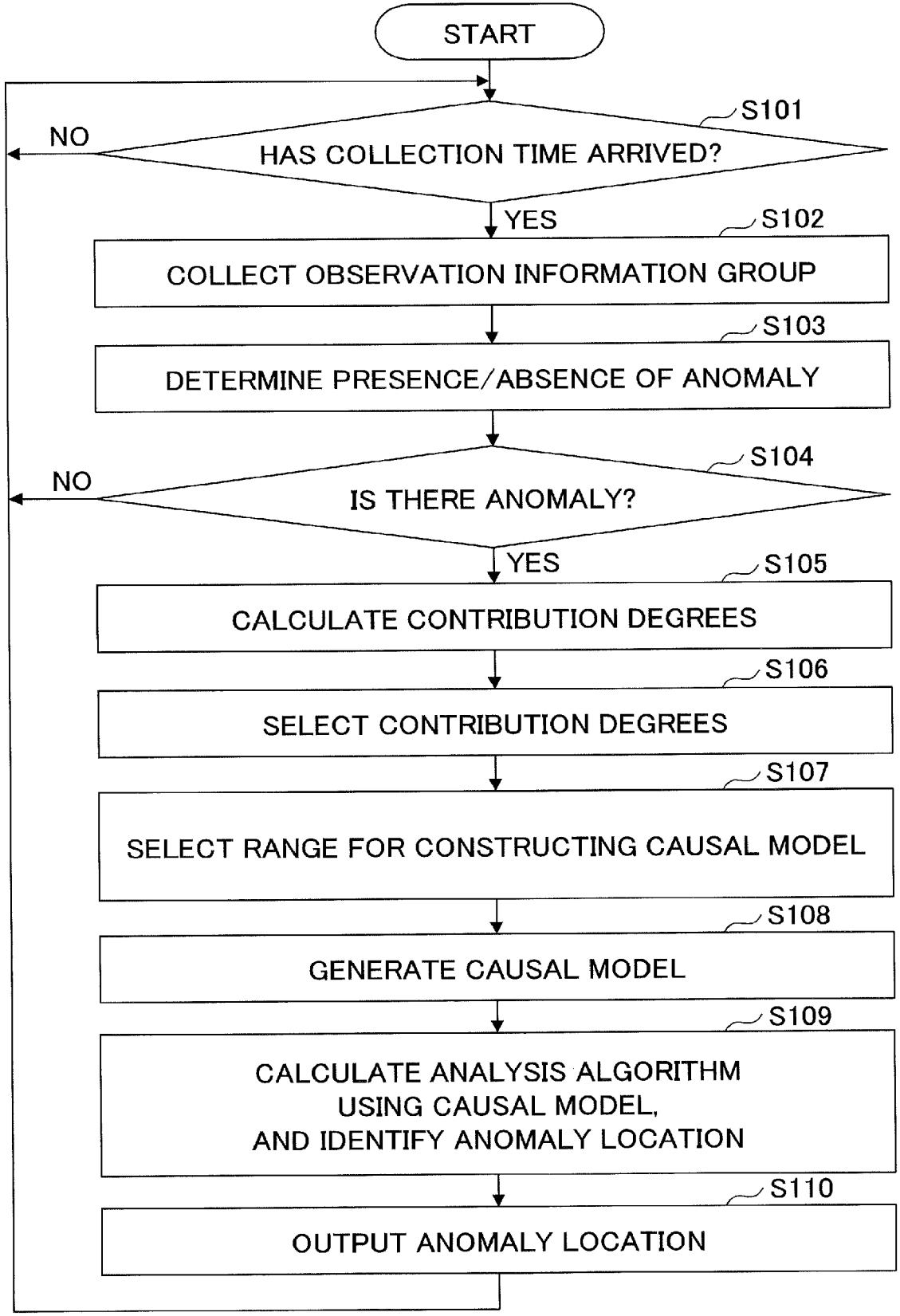
FIG. 3 is a flowchart for describing an example of processing steps executed by the anomaly location identification device 10.

In the following, processing steps executed by the anomaly location identification device 10 will be described. FIG. 3 is a flowchart for describing an example of processing steps executed by the anomaly location identification device 10.

At Step S101, the observation information collection unit 11 waits for the arrival of a collection time of an observation information group, which arrives at regular intervals. Once the collection time has arrived (YES at S101), the observation information collection unit 11 collects an observation information group output during the latest regular interval from the devices included in the communication system 1 (S102).

Next, the anomaly detection unit 12 inputs into each of the multiple types of anomaly detection algorithms, one or more observation information items required by the anomaly detection algorithm from among items in the observation information group, to perform calculation by the multiple types of anomaly detection algorithms, so as to determine the presence or absence of an anomaly (presence or absence of a detected anomaly) by each of the anomaly detection algorithms (S103). If an anomaly is detected by none of the used anomaly detection algorithms (NO at S104), the process returns to Step S101.

On the other hand, if it is determined that an anomaly is present by at least one type of anomaly detection algorithm (anomaly has been detected) (YES at S104), the contribution-degree calculation unit 13 calculates, by each of the anomaly detection algorithms that have detected the anomaly, a contribution degree group for the observation information items input into the anomaly detection algorithm (S105). The contribution degree group means one or more contribution degrees. Note that observation information items input into the respective anomaly detection algorithms may be different from algorithm to algorithm, and a function used by an anomaly detection algorithm affects the calculation of a contribution degree; therefore, the numbers and values of contribution degrees calculated by the respective anomaly detection algorithms may be different from each other.

Next, the contribution-degree selection unit 14 selects a part or parts of the contribution degree groups from among the contribution degree groups calculated by the contribution-degree calculation unit 13 as a contribution degree group to be input into the anomaly location identification unit 15 (S106). In other words, the contribution-degree selection unit 14 determines whether to input the contribution degrees calculated with one of the anomaly detection algorithms, or to input parts of the contribution degrees calculated with the respective anomaly detection algorithms that have detected the anomaly, into the anomaly location identification unit 15.

For example, the selection of a contribution degree group can be implemented by a method in which, for each anomaly detection algorithm, the sum of the top 10 absolute values is calculated from among values each obtained by dividing each contribution degree calculated with the anomaly detection algorithm, by the total value of contribution degrees with the anomaly detection algorithm, and a contribution degree group whose top 10 have a high proportion in the total sum of the absolute values is used. Specifically, for example, assume that 30 contribution degrees A are calculated with an anomaly detection algorithm A, 30 contribution degrees B are calculated with an anomaly detection algorithm B, and 30 contribution degrees C. are calculated with an anomaly detection algorithm C (i.e., a total of 90 contribution degrees are calculated). In this case, the contribution-degree selection unit 14 divides each contribution degree of A by the total value of all contribution degrees of A, and sets it as A' (30 A's are calculated). Also, the contribution-degree selection unit 14 divides each contribution degree of B by the total value of all contribution degrees of B, and sets it as B' (30 B's are calculated). Furthermore, the contribution-degree selection unit 14 divides each contribution degree of C by the total value of all contribution degrees of C, and sets it as C' (30 C's are calculated). Next, the contribution-degree selection unit 14 calculates, with respect to A', the proportion of the top 10 values of A' in the entire A' (total value of 30 A's), and calculates the same with respect to B' and C'. From among A', B', and C', the contribution-degree selection unit 14 identifies a set in which the top 10 values occupy the largest proportion (e.g., the set of A'), and selects a contribution degree group corresponding to the top 10 in the identified set, as the contribution degree group to be input into the anomaly location identification unit 15. Alternatively, the selection may be performed such that contribution degree groups corresponding to the top 10's in the above 30 A's, 30 B's, and 30 C's, respectively, are selected as a contribution degree group to be input into the anomaly location identification unit 15. In this way, by using various anomaly detection methods, it becomes possible to handle various types of anomalies.

Next, the anomaly location identification unit 15 selects a range within which an anomaly location/cause identification technique (i.e., a range for constructing a causal model) is applied, based on the contribution degree group selected by the contribution-degree selection unit 14 (S107). For example, among the contribution degrees included in the contribution degree group, a device that is an output source of observation information related to a contribution degree greater than or equal to the threshold, and its neighboring devices may be selected as the devices that specify the range. A neighboring device of a certain device refers to a device having the number of hops being one (directly connected to the certain device).

Next, the anomaly location identification unit 15 generates a causal model as a directed Markov model in which a state layer of devices $X=x_i$ ($i=1, \ldots, N$) is connected with a state layer of the observation information $Y=y_j$ ($j=1, \ldots, M$) (S108). This causal model is a causal model constructed by analyzing a causal relationship between observation information and a device configuration (connection relationship between devices). Here, N is the number of devices selected at Step S107. M is the number of observation information items input into an anomaly detection algorithm corresponding to the contribution degree group selected by the contribution-degree selection unit 14 from among the observation information items output by the devices selected at Step S107. Also, $y_j$ is a value based on a contribution degree of the j-th observation information item. As described above, the value may be a contribution degree itself, or may be a binary value (1 or 0) based on a comparison result between the contribution degree and the threshold.

Next, the anomaly location identification unit 15 performs calculation by an analysis algorithm (Non-patent documents 1 to 4) using the causal model generated at Step S108 (e.g., a directed Markov model), to identify (estimate) an anomaly location (an anomalous device) (S109). Note that in the case of using one of the analysis algorithms of Non-patent documents 1 to 4, although the configuration information of the communication system is required, the configuration information simply needs to be stored in the auxiliary storage device 102 or the like in advance. Also, in the case of the analysis algorithm of Non-patent document 3, although information on past cases of anomaly occurrences is required, the information simply needs to be stored in the auxiliary storage device 102 or the like in advance.

Next, the output unit 16 outputs information representing an anomalous device identified (estimated) by the anomaly location identification unit 15 (e.g., identification information of the anomalous device) (S110).

Note that although an example has been described above in which multiple types of anomaly detection algorithms are used, only one type of anomaly detection algorithm may be used. In this case, Step S106 does not need to be performed.

Also, the present embodiment may be applied to a system other than a communication system that includes multiple devices (or a device).

As described above, according to the present embodiment, by using the contribution degree, it is possible to uniformly input calculation results of various anomaly detection methods (anomaly detection algorithms) into an anomaly location/cause identification method, and to execute from anomaly detection to location identification as a series of operations. As a result, it is possible to improve the precision and calculation speed related to identification of an anomaly location.

Note that in the present embodiment, the anomaly detection unit 12 is an example of a determination unit. The contribution-degree calculation unit 13 is an example of a calculation unit. The anomaly location identification unit 15 is an example of an identification unit. The contribution-degree selection unit 14 is an example of a selection unit.

As above, the embodiments of the present invention have been described in detail; note that the present invention is not limited to such specific embodiments, and various modifications and changes may be made within the scope of the subject matters of the present invention described in the claims.

The present application claims the priority of Japanese Patent Application No. 2018-003117 filed on Jan. 12, 2018, the entire contents of which are incorporated herein by reference.

LIST OF REFERENCE SYMBOLS 1 communication system
10 anomaly location identification device
11 observation information collection unit
12 anomaly detection unit
13 contribution-degree calculation unit
14 contribution-degree selection unit
15 anomaly location identification unit
16 output unit
100 drive device
101 recording medium
102 auxiliary storage device
103 memory device
104 CPU
105 interface device
106 display device
107 input device
B bus

The invention claimed is:

1. An anomaly location identification device, comprising:
processing circuitry configured to
   collect information items from a plurality of devices via a network at regular intervals;
   make a determination of a presence or absence of an anomaly by inputting part or all of the information items collected from the plurality of devices into an anomaly detection algorithm;
   calculate, in response to the determination being that an anomaly is present, with respect to one of the information items, an index indicating a degree of contribution to the anomaly; and
   perform calculation by an analysis algorithm using a causal model receiving the index as input, to identify an anomalous device,
wherein the processing circuitry is further configured to
   input the part or all of the information items into a plurality of anomaly detection algorithms, to determine the presence or absence of the anomaly by each of the plurality of anomaly detection algorithms,
   calculate, in response to a determination of the presence of the anomaly made by one of the anomaly detection algorithms, by said each of the anomaly detection algorithms, indices each indicating a degree of contribution to the anomaly, for the information items input into said each of the anomaly detection algorithms, and select part of the indices from among the indices calculated for the information items input into the anomaly detection algorithms, and
   perform calculation by the analysis algorithm using the causal model receiving as input the selected indices, the indices being calculated in relation to the anomaly detection algorithm.

2. The anomaly location identification device as claimed in claim 1, wherein the processing circuitry selects a range for constructing the causal model based on the index.

3. The anomaly location identification device as claimed in claim 2, wherein the processing circuitry selects a device that specifies the range from the plurality of devices based on the index.

4. An anomaly location identification method executed by a computer, the method comprising:
   collecting information items from a plurality of devices via a network at regular intervals;
   make a determination of a presence or absence of an anomaly by inputting part or all of the information items collected from the plurality of devices into an anomaly detection algorithm;
   calculating, in response to the determination being that an anomaly is present, with respect to one of the information items, an index indicating a degree of contribution to the anomaly; and
   performing calculation by an analysis algorithm using a causal model receiving the index as input, to identify an anomalous device,
wherein the method further includes
   input the part or all of the information items into a plurality of anomaly detection algorithms, to determine the presence or absence of the anomaly by each of the plurality of anomaly detection algorithms,
   calculating, in response to a determination of the presence of the anomaly made by one of the anomaly detection algorithms, by said each of the anomaly detection algorithms, indices each indicating a degree of contribution to the anomaly, for the information items input into said each of the anomaly detection algorithms, and selecting part of the indices from among the indices calculated for the information items input into the anomaly detection algorithms, and
   performing calculation by the analysis algorithm using the causal model receiving as input the selected indices, the indices being calculated in relation to the anomaly detection algorithm.

5. A non-transitory computer-readable recording medium having a program stored thereon for causing a computer to execute the anomaly location identification method as claimed in claim 4.

6. The anomaly location identification device as claimed in claim 1, wherein the processing circuitry selects a range for constructing the causal model based on the indices.

7. The anomaly location identification device as claimed in claim 3, wherein the processing circuitry selects a device that specifies the range from the plurality of devices based on the indices.

* * * * *